United States Patent [19]

Tanner

[11] 4,304,630

[45] Dec. 8, 1981

[54] POSITION INDICATOR

[75] Inventor: David E. Tanner, Poway, Calif.

[73] Assignee: The United States of America as represented by the United States Department of Energy, Washington, D.C.

[21] Appl. No.: 122,295

[22] Filed: Feb. 19, 1980

[51] Int. Cl.³ .................. G21C 17/08; G21C 17/00
[52] U.S. Cl. ..................................... 376/258; 250/561
[58] Field of Search ............. 176/19 R, 24; 350/96.1, 350/96.2, 96.24, 96.27, 100, 101, 104, 107, 6.5, 6.9, 6.91; 250/561

[56] References Cited

U.S. PATENT DOCUMENTS

| | | | |
|---|---|---|---|
| 3,098,811 | 7/1963 | Guidi | 176/19 R |
| 3,173,844 | 3/1965 | Jones | 176/19 R |
| 3,265,584 | 8/1966 | Cooper | 176/19 R |
| 3,600,578 | 8/1971 | Porges et al. | 176/19 R |
| 3,737,372 | 6/1975 | Debergh | 176/19 R |
| 4,205,304 | 5/1980 | Moor | 176/24 |
| 4,229,069 | 10/1980 | Motin et al. | 176/19 R |

*Primary Examiner*—Sal Cangialosi

[57] ABSTRACT

A nuclear reactor system is described in which a position indicator is provided for detecting and indicating the position of a movable element inside a pressure vessel. The movable element may be a valve element or similar device which moves about an axis. Light from a light source is transmitted from a source outside the pressure vessel to a first region inside the pressure vessel in alignment with the axis of the movable element. The light is redirected by a reflector prism to a second region displaced radially from the first region. The reflector prism moves in response to movement of the movable element about its axis such that the second region moves arcuately with respect to the first region. Sensors are arrayed in an arc corresponding to the arc of movement of the second region and signals are transmitted from the sensors to the exterior of the reactor vessel to provide indication of the position of the movable element.

11 Claims, 1 Drawing Figure

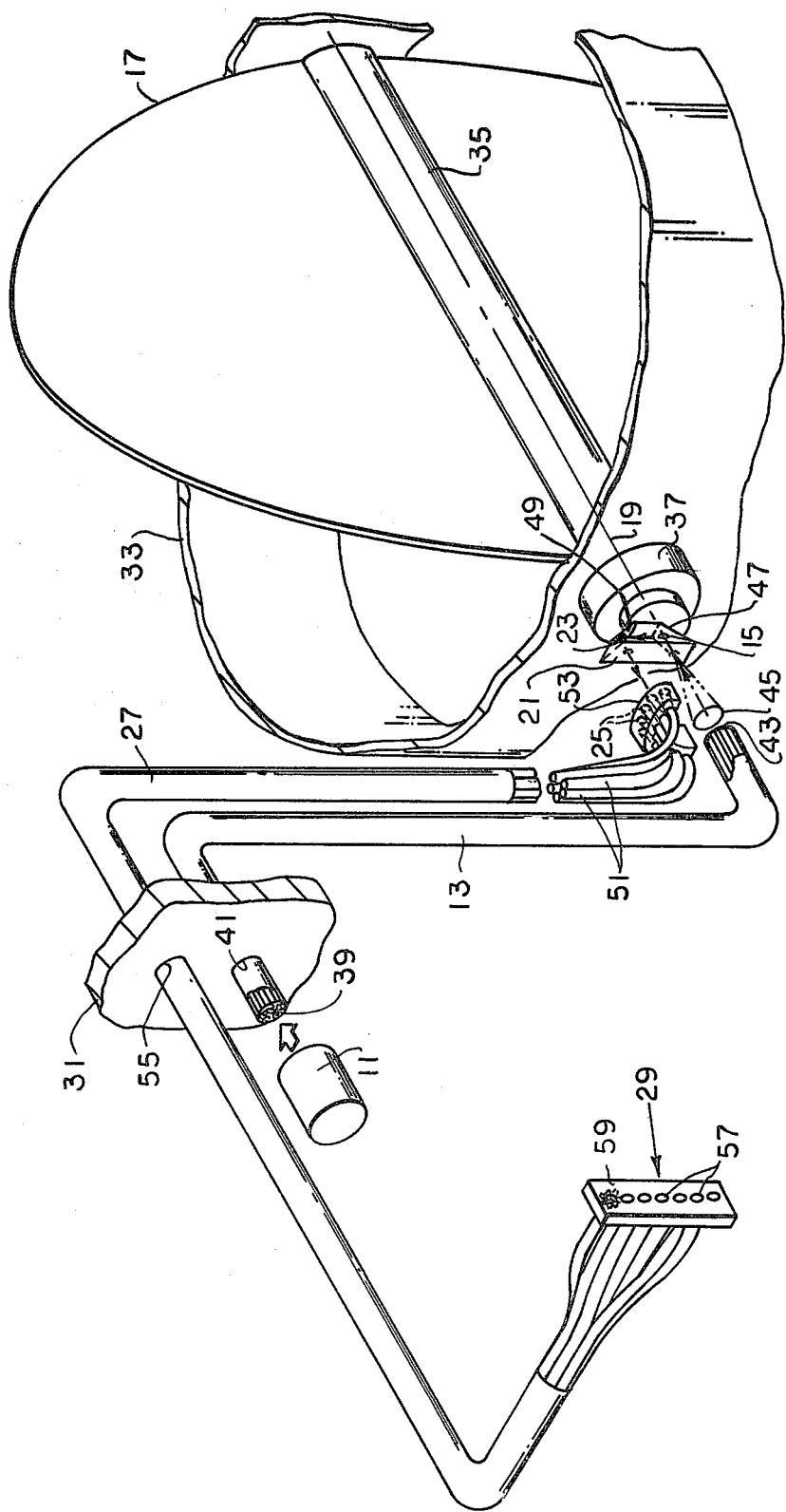

POSITION INDICATOR

The Government has rights in this invention pursuant to Contract No. DE-AT03-76SF71023 awarded by the U.S. Department of Energy.

This invention relates to position indicators and, more particularly, to a position indicator for detecting and indicating the position of a remotely located element movable about an axis, such as a rotary valve element used inside the pressure vessel in a nuclear reactor system.

In certain circumstances, it may be desirable to detect and indicate the position of an element which is movable about an axis and which is located in a remote or inaccessible position. For example, certain nuclear reactor systems, such as gas-cooled nuclear reactors, have internal loop isolation valves to prevent the back-flow of primary coolant through the shutdown loop. Such valves are typically located inside of pressure vessels and ducts, and are therefore physically inaccessible when the reactor system is operating.

It is desirable that the reactor operator know the position of the valve blades at all times of reactor operation including both normal and abnormal reactor operating conditions. Mechanical linkages or other analogous means for relaying positional information from the interior of the pressure vessel to the exterior are usually unsatisfactory because of the difficulty in transmitting mechanical movement through the pressure vessel wall while still maintaining the integrity of the pressure vessel.

It is an object of the present invention to provide a position indicator which will indicate the position, to a reactor operator, of valve blades or the like in loop isolation valves contained within the reactor pressure vessel.

A more general object of the invention is to provide an improved position indicator for detecting and indicating the position of a remotely located element movable about an axis.

A further object of the invention is to provide a nuclear reactor system having a pressure vessel and at least one movable element inside the pressure vessel, and wherein an improved position indicator provides for detection and indication of the position of the movable element.

Other objects of the invention will become apparent to those skilled in the art from the following description, taken in connection with the accompanying drawing wherein the sole FIGURE is a schematic perspective view illustrating a position indicator constructed in accordance with the invention and used in a nuclear reactor system.

Very generally, the position indicator of the invention comprises a light source 11 and first transmitting means 13 for directing light from the light source to a first region 15 at a remotely located element 17 movable about an axis 19. The first region 15 is in alignment with the axis 19. Reflector means 21 at the remote location redirect the light arriving at the first region to a second region 23. The second region is displaced radially from the first region with respect to the axis 19 of the movable element. The reflector means 21 are movable in response to and in correspondence with the movement of the movable element 17 about its axis 19 such that the second region 23 moves arcuately with respect to the first region 15 in accordance with movement of the movable element 17 about its axis 19. A plurality of sensor means 25 at the remote location form a light manifold arrayed in an arc corresponding to the arc of movement of the second region 23. Each of the sensor means is individually responsive to light when the second region is in a corresponding position. Second transmitting means 27 transmit signals from each of the sensor means 25 to an indicating location 29 which is displaced from the remote location of the movable element 17. The transmitting means provide signals indicating the position of the movable element in accordance with the response of a corresponding sensor means 25 to the position of the second region 23.

Referring now more particularly to the drawing, a preferred embodiment of the invention is shown. In the drawing, there is illustrated schematically a portion of a nuclear reactor system which includes a pressure vessel, a portion of which is indicated at 31. A portion 33 of the primary coolant duct inside the pressure vessel 31 is also shown. A valve blade 17 is mounted on an axle 35 which spans the duct 33. When the blade 17 is pivoted about the axis 19 of the axle 35, the duct may be closed or opened as required to regulate the flow of primary coolant through the duct. The axle is mounted on each end in suitable bearings 37 mounted to the wall of the duct 33. Suitable control means, not shown, are used for rotating the axle 35 to position the blade 17 as desired.

In order to precisely determine the position of the movable element or valve blade 17, the position indicator of the invention is provided. The position indicator includes the light source 11, which may be of any suitable type such as an electric light bulb. Light from the source 11 enters the end 39 of a bundle 13 of optical fibers. The bundle 13 of optical fibers constitutes the first transmitting means mentioned above and passes through a suitable opening 41 in the wall of the pressure vessel 31. The bundle 13 is of a configuration so as to direct the light from the source 11 to a location which is in alignment with the axis 19 inside the pressure vessel 31. Thus, the internal end 43 of the bundle 13 is in axial alignment with the axis 19 and the axle 35.

A lens 45 is positioned adjacent the end 43 of the bundle 13 and focuses the light transmitted by the optical fibers in the bundle 13 as described below. The light impinges on the reflector means 21 at a surface of the reflector means toward the lens 45. In the illustrated embodiment, the reflector means 21 comprise a prism having two reflecting surfaces 47 and 49. The reflecting surfaces 47 and 49 are arranged to cause the light entering the prism to impinge on the surface 47 at the region 15. From the region 15, which is aligned with the axis 19, the light is reflected 90° upwardly to the second region 23 on the reflecting surface 49. At this latter surface, the light is further reflected 90° outwardly to complete a total 180° turn in the beam of light focused by the lens 45.

The combination of the lens 45 and the prism 21 is such that the beam of light reflected by the prism is focused to a point which is equal to or slightly less than the cross-sectional size of the light fibers in the return bundle 27 as explained below. The region 23 from which the light is reflected in the prism 21 is displaced radially from the region 15 with respect to the axis 19. The prism 21 is mounted to the end of the axle 35 and rotates as the axle 35 rotates. Accordingly, the region 23 moves arcuately about the axis 19 in correspondence with the position of the movable element or valve blade 17. The beam of light exiting the prism 21 therefore is directed parallel to the axis 19 and displaced a fixed distance therefrom radially.

The second transmitting means 27 or return bundle comprise a plurality of optical fibers 51 the ends 25 of which are supported in a block 53 in an arcuate array corresponding to the arcuate path of the region 23. The light beam emanating from the prism 21 aligned with the region 23 impinges upon the ends 25 of the optical fibers 51 depending upon the movement of the prism 21 and, therefore, the movement of the movable element or valve blade 17. Accordingly depending upon the location of its end 25, each light transmitting optical fiber will respond to and transmit light impinging thereon from the prism 21. This light is then transmitted through the bundle 27 to a location outside of the pressure vessel 31. The light fiber bundle 27 passes through the wall of the pressure vessel 31 at a suitable opening 55. Because of the focusing of the lens 45, only a single optical fiber 51 responds with respect to the blade position except in the transition of the focused light from one fiber to an adjacent one.

After passing out of the pressure vessel, the optical fibers 51 are terminated at ends 57 at the indicating location 29. In the illustrated embodiment, the ends 57 are terminated in a block 59 in a vertical linear array. As illustrated, with the blade 17 in the vertical or most open position, the uppermost one of the fibers 51 at its end 57 indicates such position and this would correspond to the fiber end 25 furthest to the right in the drawing. It may be seen that as the axle 35 rotates the prism 21, the light fibers will individually cause the ends 57 to light up in descending order with increased closure of the movable element 17. The block 57 may be appropriately positioned on an instrument panel of the reactor.

In the illustrated embodiment, the invention is used in connection with a single vane valve. The invention, however, could be used to monitor multiple vanes independently of each other, rather than a single vane shown. As a further modification, a masking disc perforated to send a gray code signal may be used between the prism 21 and the light receiving ends 25. In this way, the number of optical fibers required may be reduced. Such an arrangement is described generally in "Process Instruments and Controls Handbook," by Considine, pages 17-72, paragraphs 2 and 3.

As a further embodiment of the invention the ends 25 may be replaced by photodiodes, with suitable electrical conductors replacing the optical fibers 51. The ends 57 at the indicating location may then constitute light emitting diodes energized by the current produced by the photodiodes.

It may be seen, therefore, that the invention provides an improved position indicator which is particularly suited for monitoring the location of a remotely positioned movable element, such as the vane of a duct valve inside of a pressure vessel in a nuclear reactor. The invention enables monitoring of the position of the movable element without the necessity for passing any mechanically moving parts through the pressure vessel, or independently of such parts.

Various modifications of the invention in addition to those shown and described herein will become apparent to those skilled in the art from the foregoing description and accompanying drawings. Such modifications are intended to fall within the scope of the appended claims.

What is claimed is:

1. A position indicator for detecting and indicating the position of a remotely located element movable about an axis, comprising, a light source, first transmitting means for directing light from said light source to a first region at the remote location in alignment with the axis of the movable element, reflector means at the remote location for redirecting the light arriving at the first region to a second region displaced radially from the first region with respect to the axis of the movable element, said reflector means being movable in response to and in correspondence with movement of the movable element about its axis such that the second region moves arcuately with respect to the first region in accordance with movement of the movable element about its axis, a plurality of sensor means at the remote location forming a light manifold arrayed in an arc corresponding to the arc of movement of the second region, each of said sensor means being individually responsive to light when the second region is in a corresponding position, and second transmitting means for transmitting signals from each of said sensor means to an indicating location displaced from the remote location, said transmitting means providing signals indicating the position of the movable element in accordance with the response of a corresponding sensor to the position of the second region.

2. A position indicator according to claim 1 wherein each of said sensor means, respectively, comprises an end of a fiber in a bundle of optical fibers, and wherein said second transmitting means comprise said optical fiber bundle extending from the remote location to the indicating location.

3. A position indicator according to claim 1 wherein each of said sensor means comprises a photodiode, and wherein said second transmitting means comprise a plurality of conductors, each corresponding to a respective one of said photodiodes.

4. A position indicator according to claim 1 wherein said reflector means comprise a prism mounted for rotation about the axis of the movable element.

5. A position indicator according to claim 2 wherein the ends of said optical fiber bundles opposite said sensor means are arranged in a display panel in an order corresponding to the position of the movable element.

6. In a nuclear reactor system having a pressure vessel and at least one movable element inside said pressure vessel, said movable element being movable about an axis, a position indicator for detecting and indicating the position of said movable element, said position indicator including a light source located outside said pressure vessel, first transmitting means for directing light from said light source to the interior of said pressure vessel to a first region in alignment with the axis of said movable element, reflector means inside said pressure vessel for redirecting the light arriving at said first region to a second region displaced radially from said first region with respect to the axis of said movable element, said reflector means being movable in response to and in correspondence with movement of said movable element about its axis such that the second region moves arcuately with respect to said first region in accordance with movement of said movable element about its axis, a plurality of sensor means inside said pressure vessel forming a light manifold arrayed in an arc corresponding to the arc of movement of said second region, each of said sensor means being individually responsive to light when said second region is in a corresponding position, and second transmitting means for transmitting signals from each of said sensor means to an indicating location outside of said pressure vessel, said transmitting means providing signals indicating the position of said movable elements in accordance with the response of a corresponding sensor to the position of said second region.

7. The system of claim 6 wherein each of said sensor means, respectively, comprises an end of a fiber in a bundle of optical fibers, and wherein said second transmitting means comprise said optical fiber bundle extending from the interior of said pressure vessel to the exterior thereof.

8. A system according to claim 6 wherein each of said sensor means comprises a photodiode, and wherein said second transmitting means comprise a plurality of conductors, each corresponding to a respective one of said photodiodes.

9. A system according to claim 6 wherein said reflector means comprise a prism mounted for rotation about the axis of said movable element.

10. A system according to claim 7 wherein the ends of said optical fiber bundles opposite said sensor means are arranged in a display panel in an order corresponding to the position of said movable element.

11. A system according to claim 6 wherein said movable element is mounted on an axle corresponding to the axis of said movable element, and wherein said reflector means is mounted on said axle.

* * * * *